United States Patent [19]

Nakajima et al.

[11] Patent Number: 5,119,221
[45] Date of Patent: Jun. 2, 1992

[54] LIQUID CRYSTAL DISPLAY DEVICE COMPRISING IMPROVED ALIGNMENT LAYERS FOR LIQUID CRYSTAL

[75] Inventors: Keizo Nakajima; Shigehiro Sato; Hirofumi Wakemoto; Shoichi Ishihara; Yoshihiro Matsuo, all of Osaka, Japan

[73] Assignee: Matsushita Electric Industrial Co., Ltd., Japan

[21] Appl. No.: 378,669

[22] Filed: Jul. 12, 1989

[30] Foreign Application Priority Data

Jul. 13, 1988 [JP] Japan ............................. 63-174516
Sep. 13, 1988 [JP] Japan ............................. 63-229118

[51] Int. Cl.⁵ ............................................. G02F 1/13
[52] U.S. Cl. .................................... 359/78; 359/75
[58] Field of Search ............... 350/339 R, 331, 334

[56] References Cited

U.S. PATENT DOCUMENTS

| 4,311,785 | 1/1982 | Ahne et al. | 350/341 |
| 4,469,409 | 9/1984 | Nakano et al. | 350/341 |
| 4,781,439 | 11/1988 | Yokokura et al. | 350/341 |
| 4,796,979 | 1/1989 | Tsuboyama | 350/341 |
| 4,820,026 | 4/1989 | Okada et al. | 350/341 |
| 4,879,059 | 11/1989 | Hanyu et al. | 350/341 |
| 4,882,207 | 11/1989 | Coates et al. | 350/341 |

FOREIGN PATENT DOCUMENTS

| 0177271 | 4/1986 | European Pat. Off. | |
| 0264808 | 4/1988 | European Pat. Off. | |
| 61-47931 | 3/1986 | Japan | 350/334 |
| 61-61131 | 3/1986 | Japan | |
| 62-159123 | 7/1987 | Japan | |
| 63-32522 | 2/1988 | Japan | 350/334 |
| 63-0158526 | 7/1988 | Japan | 350/334 |
| 63-309919 | 12/1988 | Japan | 350/334 |
| 1-243026 | 9/1989 | Japan | 350/334 |
| 1-248139 | 10/1989 | Japan | 350/334 |

OTHER PUBLICATIONS

"Polyimide Alignment Film for Liquid Crystal" by H. Fukuro IED88-37; pp. 19-23.

"Surface Technoloties for Liquid Crystal Display" by S. Naemura The Surface Chemistry, vol. 9, No. 4 (1988); pp. 11-17.

Primary Examiner—Rolf Hille
Assistant Examiner—S. V. Clark
Attorney, Agent, or Firm—Lowe, Price, Leblanc & Becker

[57] ABSTRACT

37 A liquid crystal display device is provided which comprises a cell unit having a pair of optically transparent substrates each having an optically transparent electrode layer and an alignent layer for liquid crystal formed in this order on one side of the substrate. The paired substrates is in spaced relation with each other and is arranged such that the respective alignment layers are facing each other. A liquid crystal is contained in the space between the paired substrates. The alignment layers are made of a polymer material having both a ring structure and a substituted group at side chains thereof and are subjected to rubbing treatment. The use of the alignment layers ensures a great pretilt angle for liquid crystal molecules.

17 Claims, 1 Drawing Sheet

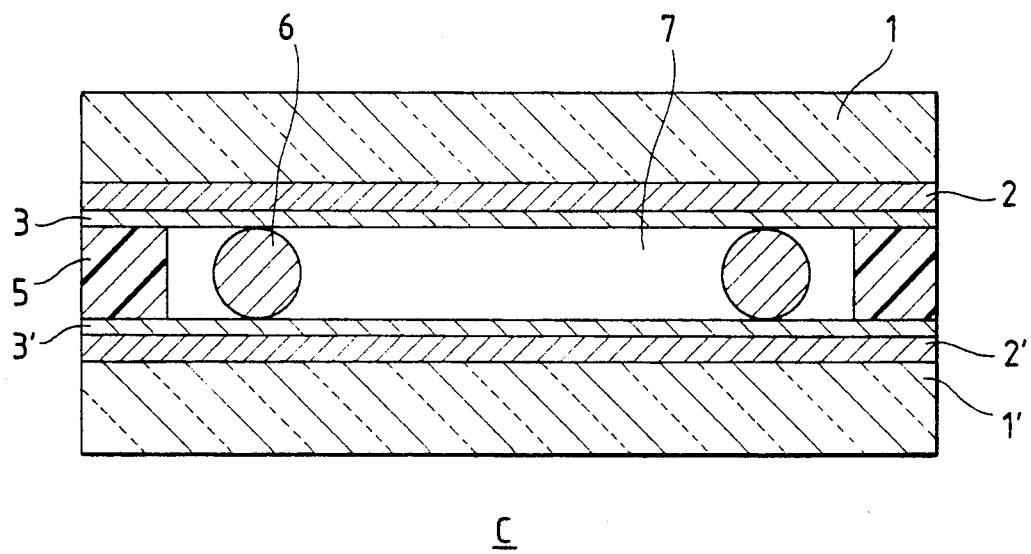

LIQUID CRYSTAL DISPLAY DEVICE COMPRISING IMPROVED ALIGNMENT LAYERS FOR LIQUID CRYSTAL

BACKGROUND OF THE INVENTION

1. Field of the Invention

This invention relates to liquid crystal display devices and more particularly, to an improvement in alignment layers for liquid crystal used in such devices.

2. Description of the Prior Art

For obtaining good display characteristics in liquid crystal displays, it is necessary that the liquid crystal be aligned in a given direction and mono-domainized. For this purpose, the molecules of liquid crystal have to be aligned in one direction by the interfacial effect. A number of studies have been heretofore made on the alignment of liquid crystal. Typical liquid crystal alignment methods include an oblique deposition method and a rubbing method.

In the oblique deposition method, an oxide such as SiO is vacuum deposited obliquely with respect to the surface of substrate in a thickness of several hundred to several thousand angstroms to form an alignment layer for liquid crystal. If the angle of the deposition relative to the substrate plane is small, the molecules of liquid crystal are aligned obliquely. At this time, the long axis of the respective molecules is arranged along the direction of the deposition beam. On the other hand, when the deposition angle is sharp, the angle of inclination or pretilt angle of the liquid crystal molecules becomes substantially zero and the molecules are aligned homogeneously. The alignment of the molecules is such that the direction of the long axis of the molecules makes a right angle with the direction of the deposition beam. The specific alignment of the molecules realized by the oblique deposition technique is considered to result from the interaction of the ripple pattern of the layer formed on the substrate by the vacuum deposition and the liquid crystal molecules. The minute difference in the ripple pattern will produce the difference between the parallel alignment and the oblique alignment.

On the other hand, the rubbing method is an alignment treatment where an organic polymer layer or film formed on substrate is rubbed in a given direction. The reason why the molecules of liquid crystal are aligned by the influence of the rubbed layer are not fully clarified. Presumably, the alignment is considered to occur in the following manner: when the alignment film is rubbed so that the shear stress is applied onto the surface of the film, the polymer chains in the vicinity of the surface are arranged along the direction of the rubbing; and the liquid crystal is aligned along the arrangement of the polymer chains. The polymers ordinarily used as the alignment film are linear polymers such as polyimides, polyvinyl alcohol and the like. The pretilt angle of liquid crystals is, at most, from 0 to several degrees.

However, these oblique vacuum deposition and rubbing techniques have the following drawbacks.

With the oblique deposition technique, it is difficult to obtain a uniform alignment layer with a large area. Where a substrate to be deposited has a large deposition area, the angle of the deposition becomes different at edge and central portions of the substrate. This entails the difference in pretilt angle of liquid crystal. In addition, the deposition apparatus is necessary with high product costs.

According to the rubbing technique, a display element can be fabricated more easily than that obtained by the oblique deposition technique. The rubbing technique has been widely used for alignment of conventional display elements using nematic liquid crystals or so-called twisted nematic systems. However, with super twisted nematic (STN) liquid crystal displays which aim at the large area and high contrast of the display, the alignment with rubbing is not satisfactory in that the pretilt angle of liquid crystal is small, so that a hysteresis phenomenon is involved in voltage-transmission characteristic. Thus, an adequate threshold value cannot be obtained. Especially, with display elements using ferrodielectric liquid crystal, the pretilt angle is from zero to several degrees which is smaller than those attained by the oblique deposition technique. In addition, a disinclination position called zigzag defect is produced, making it difficult to obtain a high contrast.

Although the oblique deposition and rubbing techniques have, respectively, the merits, the problems as set out above are involved, making it very difficult to inexpensively obtain liquid crystal display devices having good characteristics.

SUMMARY OF THE INVENTION

It is accordingly an object of the invention to provide a liquid crystal display device having an improved alignment layer for liquid crystal easily and inexpensively.

It is another object of the invention to provide a liquid crystal display device which comprises an improved alignment layer which ensures a large pretilt angle of liquid crystal molecules.

It is a further object of the invention to provide a liquid crystal display device wherein not only nematic liquid crystals, but also ferrodielectric liquid crystals are usable.

It is a still further object of the invention to provide a liquid crystal display device which comprises an alignment layer for liquid crystal made of a polymer having a ring structure and a substituted group at side chains.

According to the present invention, there is provided a liquid crystal display device which comprises a cell unit having a pair of optically transparent substrates each having an optically transparent electrode layer and an alignment layer for liquid crystal formed in this order on one side of the substrate, the paired substrates being in spaced relation with each other and arranged such that the respective alignment layers are facing each other, and a liquid crystal contained in the space between the paired substrates. The alignment layer is made of a polymer having both a ring structure and a substituted group at side chains. A controlled pretilt angle of liquid crystal is obtained by the use of the polymer layer which has been subjected to rubbing treatment. It will be noted that the term "polymer having both a ring and a substituted group" means a polymer having a ring structure with a substituent at side chains or a polymer having separately a ring structure and a substituent at side chains.

Since the alignment layer is made of a polymer having at side chains a ring structure and a substituted group, a liquid crystal is aligned by the interaction with the ring and substituted group at the side chains. We have found that the degree of pretilt angle differs depending upon the types of ring structure and substituted group, the ratio between the ring structure and the substituted group contained in polymer, the manner of rubbing, the type of liquid crystal, the temperature and the like.

In order that a liquid crystal is aligned at an appropriate pretilt angle, the alignment layer should be made of a polymer having both a ring structure and a substituted group. For this purpose, the polymer may be homopolymers or copolymers having both the ring and the substituted group, and blends of two or more these polymers with or without incorporating polymers free of both or either of the ring and the substituent.

The use of the alignment film for liquid crystal according to the invention ensures a great and uniform pretilt angle of liquid crystal simply by a film of polymer having been subjected to rubbing treatment. Conventionally, such a great and uniform pretilt angle has been attained only by the oblique vacuum deposition technique. The alignment film or layer may be applied to not only super twisted nematic liquid crystal display devices, but also to ferrodielectric liquid crystal display devices.

BRIEF DESCRIPTION OF THE DRAWING

The sole FIGURE is a schematic sectional view of a liquid crystal display device according to the invention.

DETAILED DESCRIPTION AND EMBODIMENTS OF THE INVENTION

Reference is now made to the sole FIGURE, which depicts a liquid display cell unit C. The cell unit C includes a pair of substrates 1, 1' having, respectively, optically transparent electrodes 2,2' and alignment layers 3,3' formed in this order. The paired substrates 1,1' are sealed with a sealing resin 5, such as an epoxy resin, along the periphery of the substrates 1,1'. The paired substrates 1,1' are in spaced relation by provision of bead spacers 6 between the substrates 1,1'. The bead spacers 6 may be in the form of a sphere and is generally made of glass, plastic resins or the like.

A liquid crystal 7 is filled in the space established between the paired substrates 1,1'.

The substrates 1,1' should be optically transparent and are made, for example, of glass, plastics and the like. Each substrate has an optically transparent electrode 2 or 2' which is made of any material ordinarily used for this purpose. Typical materials for the electrode 2 or 2' are indium tin oxide (ITO), $SnO_2$ and the like. The electrode 2 or 2' is generally formed in a thickness of from 200 to 1500 angstroms.

The present invention is characterized by the alignment layer or film 3 or 3' which is formed on the respective electrode 2 or 2'. The layer 3 or 3' is made of a polymer which has a ring structure and a substituted group at side chains thereof. The main chain of the polymer is not critical and may be made of olefinic units, vinyl units, ester units, ether units, amido units, imino units and the like. The ring structure should be attached to the polymer at side chains but may be directly joined to the main chain. Examples of the rings include aromatic rings, aliphatic rings, heterocyclic rings, and condensed rings. Specific examples includes a cyclopentane ring, a cyclohexane ring, a benzene ring, a naphthalene ring, a furan ring, an oxolan ring, a dioxolan ring, a thiophene ring, a pyrrole ring, a pyran ring, an oxane ring, a dioxane ring, a pyridine ring, a piperidine ring, a pyrimidine ring, a pyrazine ring and the like. In the practice of the invention, at least one ring should be contained at side chains and the ring of side chain may be joined directly to the main chain.

Examples of the substituted group include halogens such as F, Cl, Br, and I, CN, $NO_2$, $NH_2$, OH, OR, R, CHO, COOH, COR or COOR wherein each R represents a linear or branched alkyl group having from 1 to 10 carbon atoms. These substituted groups may be incorporated into the polymer for the layer 3 or 3' as a substituent of the rings mentioned above or by copolymerization of a monomer having a ring structure and a monomer having a substituted group or by blending two types of polymers, one having a ring structure at side chains and the other having a substituted group at side chains.

As described before, since the alignment layer is made of a polymer having a side chains a ring structure and a substituted group, a liquid crystal is aligned by the interaction with the ring and substituted group at the side chains. The pretilt angle may differ depending upon the types and contents of ring structure and substituted group, the ratio between the ring structure and the substituted group contained in polymer, the manner of rubbing, the type of liquid crystal, the temperature and the like. In particular, the type of substituted group greatly influences the pretilt angle. The electron acceptive groups cause a greater variation in pretilt angle than electron donative groups. The use of electron acceptive groups is convenient for properly controlling the pretilt angle. Examples of the electron acceptive group include, among those groups defined before, F, Cl, Br, I, CN, $NO_2$, CHO, COOH, —COR and COOR wherein each R is a linear or branched alkyl group having from 1 to 10.

More specific examples of the polymer materials are described below.

a) Homopolymers having a ring structure and a substituted group at side chains: polymers of halostyrenes such as p-chlorostyrene, m-chlorostyrene, o-chlorostyrene, α-chlorostyrene, β-chlorostyrene and dichlorostyrene, polynitrostyrene, polymers of substituted or unsubstituted aromatic compounds such as o, m, p, α, β and di-methylstyrene, o, m, p, α, β and di-ethylstyrene, o, m, p, α, β and di-fluorostyrene, o, m, p, α, β and di-phenylstyrene, o, m, p, α, β and di-diphenylstyrene, o, m, p, α, β and di-hydroxystyrene, o, m, p, α, β and di-methoxystyrene, o, m, p, α, β and di-isopropylstyrene, o, m, p, α, β and di-tert-butylstyrene, o, m, p, α, β and di-chlorovinylcyclohexane, o, m, p, α, β and di-methylphenylacetylene and the like, polymers of 5-chloro-3-vinypyridine, 2-methyl-4-vinylpyridine, 4-methyl-2-vinylthiophene, 2-vinyl-5-nitrofuran, 1,1-dichloro-2-vinylcyclopropane, N-n-nitrophenyl-acrylamide, N-p-chlorophenyl-propylamide and the like.

b) Copolymers or condensation products: copolymers of the monomers indicated in (a) and copolymerizable monomers such as olefinic or vinyl monomers such as ethylene, propylene, vinyl chloride, vinyl fluoride, vinyl bromide, vinyl acetate, vinyl propionate, vinyl stearate, acrylic acid, acrylates such as methyl and ethyl acrylates, methacrylic acids, methacrylates, vinyl ethers such as vinyl methyl ether, vinyl ethyl ether, vinyl phenyl ether, acrolein, acrylonitrile, vinyl methyl ketone, vinylidene chloride, vinylidene fluoride, vinylidene cyanide and the like, co-condensation products of heterocyclic compounds and copolymerizable monomers such as furfuryl alcohol and formaldehyde, amides and the like.

c) Polymer blends of those polymers of (a) and (b) above, polymers having a ring structure as mentioned above and polymers having a substituted group as mentioned above, e.g. combinations of polyvinyl chloride and polystyrene, polyvinyl ethyl ether and polystyrene, polyvinylidene fluoride and polyvinyl cyclohexane, and the like. These polymer blends may further comprise polymers with or without any ring and/or substituent such as polyimides, polyethylene, polyamides and the like in amounts sufficient to control a pretilt angle of liquid crystal as desired. If p-chlorostyrene polymer and polyimide are blended, the pretilt angle can be varied from 1° to 85° for nematic liquid crystals.

Upon consideration of the solubility in solvent, these polymers should preferably have a degree of polymerization of from 500 to 500,000.

In view of the easy availability, cost and ease in control of the pretilt angle, various chlorostyrene homopolymers or copolymers with styrene are preferred. If the copolymers of various chlorostyrene monomers and styrene are used, the ratio by weight of these components is preferably in the range of from 80:20 to 40:60. Polynitrostyrene is also preferred. Moreover, various chlorostyrene polymers, fluorostyrene polymers and phenylstyrene polymers are preferably used in order to obtain alignment layers having different pretilt angles of liquid crystal.

The layer 3 or 3' is formed by any known method ordinarily used to form an alignment polymer film. For instance, a polymer for the layer 3 or 3' is dissolved in solvent and applied by a spin coating technique or a printing technique such as a gravure coating. The thickness of the layer 3 or 3' generally ranges from 300 to 2000 angstroms.

The layers 3,3' should be subjected to rubbing treatment. The rubbing is effected using a fiber cloth such as a nylon cloth. In the practice of the invention, the rubbing is carried out in such a way that the layer 3 or 3' is rubbed with a nylon cloth (e.g. NB-1L available from Hiroki Company) by pressing it down onto the cloth at a load of several tens $g/cm^2$ and moving unidirectionally over the cloth for several to several ten times slowly at a velocity of 7 cm/second. This rubbing treatment may be automatically made using a rubbing machine.

The layers 3,3' may be facing such that the rubbing direction of one layer is the same as or opposite from that of the other layer.

The liquid crystals usable in the present invention may be not only nematic liquid crystals, but also ferrodielectric liquid crystals or chiral liquid crystals. Nematic liquid crystals include Schiff, azoxy, ester, biphenyl and phenylcyclohexane liquid crystals. Usually, these compounds are used in the form of mixture of several to several ten liquid crystals.

Ferrodielectric liquid crystals are described.

In recent years, ferrodielectric liquid crystals have been extensively studied for application as an electro-optic element. Ferrodielectric liquid crystals have good characteristics such as high-speed electric field responsibility and a memory effect wherein a display state is maintained when no electric field is applied. If a display device can be fabricated using such a ferrodielectric liquid crystal, a display with a large size and high fineness can be realized.

Since the ferrodielectric liquid crystal has a layer structure as is different from nematic liquid crystals, it is more difficult to obtain a uniform alignment than with nematic liquid crystals. When the temperature is decreased, some ferrodielectric liquid crystals undergo a phase change of from an isotropic liquid phase (I phase) directly to a chiral smectic phase C (SmC·). However, such liquid crystals are generally very difficult to uniformly align. Most ferrodielectric liquid crystals undergo phase transition into the SmC· phase through a cholesteric phase (Ch phase) or a smectic A phase (SmA phase) at high temperatures. Of the liquid crystals which undergo the phase change through the Ch phase, those liquid crystals wherein spiral pitches of the Ch phase are significantly longer than the thickness of cell have been accepted to exhibit good alignment.

The alignment techniques for these ferrodielectric liquid crystal include a shearing method, a temperature gradient method, an oblique deposition method and a rubbing method. According to the shearing method and temperature gradient method, a uniform alignment of liquid crystal with an area of several mm square is obtained on a laboratory scale. However, a difficulty has been involved in obtaining a larger area for the alignment.

It has been reported that a ferrodielectric liquid crystal display device obtained by known oblique deposition techniques exhibits uniform alignment and good memory when the deposition angle is set at not higher than 10°. In this case, the liquid crystal is assumed not to have such a pretilt angle that the layer structure of liquid crystal is vertical to the substrate, but the layer structure is tilted against the substrate at a given angle.

For instance, the SiO layer formed by the oblique deposition is considered to have a pretilt angle as large as about 20° and the layers of liquid crystal are tilted with respect to the substrate plane.

With the rubbing methods, attempts have been made using polyimide or polyvinyl alcohol films as in the case of known nematic liquid crystal devices. In the oblique deposition method, however, it is difficult to obtain a uniform alignment layer of a large size. The rubbing method using ferrodielectric liquid crystals are disadvantageous in that the pretilt angle is small at 0 to several degrees.

These disadvantages for ferrodielectric liquid crystals are also overcome according to the invention. This is true of known ferrodielectric liquid crystals such as various esters.

The present invention is more particularly described by way of examples.

EXAMPLES 1 TO 5 p-Chlorostyrene and styrene were copolymerized at different ratios by weight for use as a polymer for alignment layer for liquid crystal. These monomers were reacted in benzene solvent in an atmosphere of nitrogen by the use of a α,α'-azodiisobutylonitrile polymerization initiator while refluxing for 8 hours. The reaction was completed by addition of methanol.

A liquid crystal display device is shown in the FIGURE was made in the following manner.

Each copolymer obtained above was dissolved in toluene at a concentration of 1.5 wt % and subjected to spin coating on glass substrates each having an ITO electrode in a dry thickness of 1000 angstroms. The coated solution was dried at 150° C. for 1 hour thereby forming an alignment layer on each substrate through the ITO electrode.

The alignment layer of each substrate was subjected to rubbing treatment using a nylon cloth in such a way that the layer was rubbed in one direction 10 times at a load of 37 $g/cm^2$. The substrates were bonded with a sealing epoxy resin through spacers except for an injection port for liquid crystal so that the respective layers were arranged in the same rubbing directions. A nematic liquid crystal, i.e. a cyanobiphenyl-based liquid crystal (D102Z63 available from BDH Co., Ltd.), was charged into the device under reduced pressure at normal temperatures, followed by sealing the injection port, thereby obtaining liquid crystal cells.

These cells were subjected to observation through a substituted microscope, revealing that the liquid crystal was uniformly aligned.

In Table 1, there are shown the ratio by weight of p-chlorostyrene and styrene use for the copolymerization and the pretilt angle obtained when using the films of the copolymers for assembling the liquid crystal cell. The pretilt angle was determined by measuring a variation in electric capacitance of the liquid crystal which had been aligned in magnetic field.

TABLE 1

| Example | p-Chlorostyrene:Styrene (by weight) | Pretilt Angle (degree) |
| --- | --- | --- |
| 1 | 100:0 | 90 |
| 2 | 80:20 | 65 |
| 3 | 60:40 | 35 |
| 4 | 40:60 | 20 |
| 5 | 20:80 | 5 |

From this, the copolymer should preferably have a content of p-chlorostyrene in amounts not less than 20 wt % of the copolymer in order to ensure a certain level of the pretilt angle.

EXAMPLES 6 TO 12

Nitrated polystyrene was prepared in the following manner for use as a polymer for alignment layer.

Powdered polystyrene having a molecular weight of about 350,000 was dissolved in fuming nitric acid cooled to $-10°$ C. Subsequently, the nitration was effected under different conditions of a temperature ranging from 50° to 95° C. and a time ranging from 0.5 to 5 hours, thereby introducing different numbers of nitro groups per unit benzene ring. The number of the substituent was determined according to the elementary analysis.

The alignment films were made using these nitrated polymers and used to make nematic liquid crystal cells in the same manner as in Example 1.

These cells were observed through a polar microscope, revealing that the liquid crystal was aligned uniformly.

In Table 2, there are shown the results with respect to the number of the nitro groups per unit benzene ring and the pretilt angle of the respective cells.

TABLE 2

| Example | Number of Nitro Groups Per Benzene Ring | Pretilt Angle of Liquid Crystal (degree) |
| --- | --- | --- |
| 6 | 0.2 | 2 |
| 7 | 0.6 | 8 |
| 8 | 0.8 | 17 |
| 9 | 1.0 | 24 |
| 10 | 1.2 | 30 |
| 11 | 1.5 | 40 |
| 12 | 2.0 | 45 |

From the above, it will be seen that a significant effect of the nitration is obtained when the number of nitro groups per unit benzene ring is at least not less than 0.6.

EXAMPLE 13

The copolymer having a weight ratio of p-chlorostyrene and styrene of 40:60 and obtained in Example 4 was formed on ITO electrodes of substrates in the same manner as in the foregoing examples. These films were rubbed in one direction using a nylon cloth at a load of 37 g/cm$^2$ and used to make a super twisted nematic cell with a twisted angle of 270°. A nematic liquid crystal (Lixon 4023 available from Merck Inc.) was charged into the cell under reduced pressure at normal temperatures.

This cell was observed through a polar microscope, revealing uniform alignment of the liquid crystal and a good voltage-transmission characteristic.

EXAMPLE 14

The polymer having the number of nitro groups per benzene ring of 1.0 and obtained in Example 9 was formed as a film on ITO electrodes of substrates in the same manner as in the foregoing examples. These films were rubbed in one direction using a nylon cloth at a load of 37 g/cm$^2$ and used to make a super twisted nematic cell with a twisted angle of 270°. A nematic liquid crystal (Lixon 4023) was charged into the cell under reduced pressure at normal temperatures.

This cell was observed through a polar microscope, revealing uniform alignment of the liquid crystal and a good voltage-transmission characteristic.

EXAMPLE 15

The copolymer used in Example 13 was used to make an alignment film on an ITO electrode of each substrate in the same manner as in the foregoing examples. The films were rubbed in the same manner as in Example 14 and the substrates were assembled through spacers with a diameter of 2.0 micrometers so that the films were in the same rubbing directions. A liquid crystal used was an ester-based ferrodielectric liquid crystal (CS-1014 available from Chisso Petrochemical Corp.) which was able to undergo the following phase transition changes. This liquid crystal was charged into the cell under reduced pressure at 90° C. at which it was in the I phase.

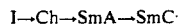

I→Ch→SmA→SmC·

This cell was observed through a polar microscope in a temperature range of the SmC· phase, with the result that the ferrodielectric liquid crystal cell was free of defects and had uniform alignment of the liquid crystal with good contrast and memory characteristics.

EXAMPLE 16

The polymer used in Example 14 was formed as a film in the same manner as in the foregoing examples. The alignment film on each glass substrate was rubbed as in the foregoing example and two substrates were assembled through spacers with a diameter of 2.0 micrometers so that the alignment films were in the same rubbing directions. A ferrodielectric liquid crystal (CS-1014) which was able to undergo the following phase transition changes was charged into the cell under reduced pressure at 90° C. (I phase)

I→Ch→SmA→SmC·

The cell was observed through a polar microscope in a temperature range of the SmC· phase, revealing that the ferrodielectric liquid crystal displace device was free of defects and had uniform alignment of the liquid crystal with good contrast and memory characteristics.

EXAMPLE 17

Mixtures of poly(p-chlorostyrene and polyimide having different mixing rations by weigh were each dissolved in N-methyl-2-pyrrolidinone at a concentration of 4.5 wt % and spin coated onto each glass substrate through an ITO electrode formed on the substrate in a dry thickness of 1000 angstroms, followed by drying at 100° C. for 1 hours.

The resultant alignment layer on the respective glass substrates was rubbed in one direction in the same manner as in the foregoing examples. After the rubbing, two substrates were assembled through bead spacers with a diameter of 6.0 micrometers wherein the films were facing so that the rubbing directions were opposite to each other. The assembled substrates were sealed with a resin except for an injection portion for liquid crystal to obtain a cell. A nematic liquid crystal (D102Z63) was charged into the cell under reduced pressure at normal temperatures, after which the port was sealed.

The cells were subjected to observation through a polar microscope, revealing that the liquid crystal was uniformly aligned. Table 3 shows the mixing ratio and pretilt angle of the liquid crystal.

TABLE 3

| Poly(p-chlorostyrene): Polyimide (by weight) | Pretilt Angle (degree) |
| --- | --- |
| 100:0 | 85 |
| 80:20 | 65 |
| 60:40 | 35 |
| 40:60 | 20 |
| 20:80 | 5 |
| 0:100 | 1 |

From the above results, the polymer having a substituted group and a ring structure should preferably be contained in amounts not less than 20 wt % in order to ensure a high pretilt angle.

EXAMPLE 18

A mixture of poly(p-chlorostyrene) and polyimide with a ration by weight of 40:60 was prepared and formed as a film and rubbed in the same manner as in Example 17. Two substrates were assembled where the rubbed directions of the films were determined in such a way that a twisted angle of liquid crystal was 270° when a liquid crystal was charged into the resultant cell. A nematic liquid crystal (Lixon 4023) was charged into the cell under reduced pressure at normal temperature.

The pretilt angle was measured, with the result that the liquid crystal molecules were tilted at about 18° with respect to the substrate surface.

The observation through a polar microscope revealed that the cell had good alignment and was free of defects.

EXAMPLE 19

A mixture of poly(p-chlorostyrene) and polyimide was at a mixing ratio by weight of 40:60 was prepared and formed as a film and rubber in the same manner as in Example 17.

Two substrates were assembled through spacers with a diameter of 2.0 micrometers where the rubbed directions of the films were opposite to each other, thereby obtaining a cell. A ferrodielectric liquid crystal (CS-1014) which was able to undergo the following changes in phase transition was charged into the cell under reduced pressure at 90° C. (I phase).

I→Ch→SmA→SmC

The cell was subjected to measurement of pretilt angle, revealing that the liquid crystal molecules were tilted at about 17° with respect to the substrate surface.

The observation through a polar microscope revealed that the ferrodielectric liquid crystal display cell was free of defects and had uniform alignment with good contrast and memory characteristics.

In the above examples, p-chlorostyrene and nitrated styrene polymers are used as a polymer material having both a ring structure and a polar group in the form of a homopolymer, copolymers or polymer blends, and similar results are obtained when using polymer materials having, at side chains, other ring structures and other substituted groups defined before.

What is claimed is:

1. A liquid crystal display device which comprises a cell unit having a pair of optically transparent substrates each having an optically transparent electrode layer and an alignment layer for liquid crystal formed in this order on one side of the substrate, the paired substrates being in spaced relation with each other and arranged such that the respective alignment layers are facing each other, and a liquid crystal contained in the space between the paired substrate, said alignment layers being made of a polymer material having both a ring structure and a substituted group at side chains thereof in such a way that said ring structure is directly joined to a main chain of the polymer, wherein the ring is an aromatic ring structure, an alicyclic structure, a heterocyclic structure or a condensed ring structure, and being subject to rubbing treatment.

2. The liquid crystal display device according to claim 1, wherein said substituted group is at least one member selected from the group consisting of F, Cl, Br, I, CN, $NO_2$, $NH_2$, OH, CHO, COOH, OR, R, COR and COOR wherein each R is a linear or branched alkyl group having from 1 to 10 carbon atoms.

3. The liquid crystal display device according to claim 2, wherein said substituted group is attached to the ring structure at side chains.

4. The liquid crystal display device according to claim 2, wherein said substituted group is an electron acceptive group.

5. The liquid crystal display device according to claim 1, wherein said polymer material has a ring structure which is directly attached to a main chain of said polymer material and which has the substituted group.

6. The liquid crystal display device according to claim 5, wherein said polymer material is a homopolymer of a styrene derivative.

7. The liquid crystal display device according to claim 6, wherein said styrene derivative is chlorostyrene.

8. The liquid crystal display device according to claim 6, wherein said homopolymer is a nitrated styrene polymer.

9. The liquid crystal display device according to claim 8, wherein said nitrated styrene polymer has not less than 0.8 nitro groups per unit benzene group.

10. The liquid crystal display device according to claim 5, wherein said polymer material is a copolymer of a styrene derivative and a copolymerizable monomer.

11. The liquid crystal display device according to claim 10, wherein said copolymer is a copolymer of chlorostyrene and styrene having a content of chlorostyrene not less than 20 wt %.

12. The liquid crystal display device according to claim 5, wherein said polymer material is a polymer blend of a homopolymer of a styrene derivative and a polymer with or without any ring structure and substituted group.

13. The liquid crystal display device according to claim 12, wherein said homopolymer of the styrene derivative is contained in an amount of not less than 20 wt % of the polymer.

14. The liquid crystal display device according to claim 1, wherein said liquid crystal is a nematic liquid crystal.

15. The liquid crystal display device according to claim 1, wherein said liquid crystal is a ferrodielectric liquid crystal.

16. The liquid crystal display device according to claim 5, wherein said polymer material is a polymer blend of a copolymer of a styrene derivative and a polymer with or without any ring structure and substituted group.

17. The liquid crystal display device according to claim 16, wherein said copolymer of the styrene derivative is contained in an amount of not less than 20 wt % of the polymer.

* * * * *